Patented Mar. 15, 1927.

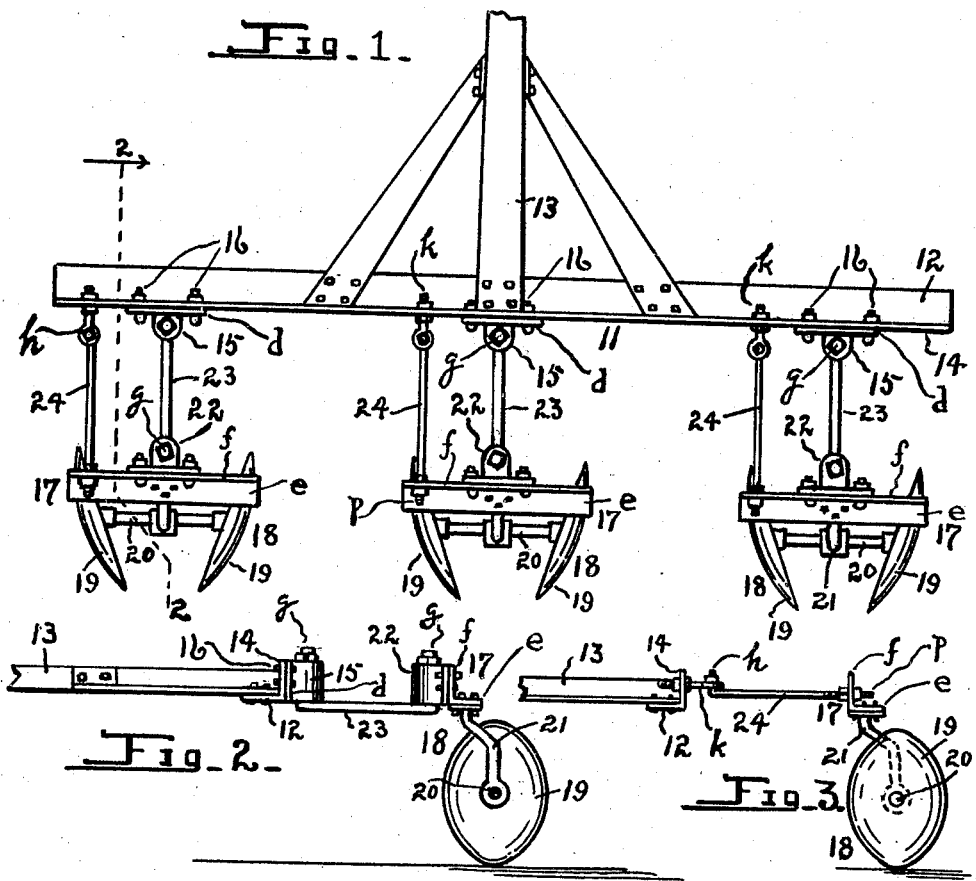

1,620,697

UNITED STATES PATENT OFFICE.

JOSEPH SPENCE, OF MAYWOOD, NEBRASKA.

SPACE-ADJUSTING MEANS FOR GROUND-ENGAGING IMPLEMENTS.

Application filed July 16, 1925. Serial No. 43,973.

This invention has reference to an adjustable hitch for a lister, cultivator or other implement used in fields where corn or other crops are disposed in rows, and has for its object to provide such a construction that the implement may be adjusted for use in instances where the rows in fields are wide apart or comparatively narrow, the parts to be so arranged that adjustments may be readily made.

The invention includes means for preventing transverse swinging movements and maintaining the implements parallel with the line of travel so that they will operate suitably, it being understood that generally the rows are practically parallel as compared with each other and that the implements should remain approximately parallel with the rows while moving forwardly. One of the objects of the invention is to provide means for the foregoing purposes which will consist of few and simple parts so that manufacture will be practical and economical.

The invention consists of the new and useful construction, combination and arrangement of parts as described herein and claimed, and as illustrated in the accompanying drawing, it being understood that changes in form, size, proportion of parts and minor details may be made as found to be convenient, said changes being determined by the scope of the invention as claimed.

In the drawing, Fig. 1 is a plan view of the device. Fig. 2 is a sectional view on line 2—2 of Fig. 1. Fig. 3 is a view showing the mounting of a radius rod upon a drag-bar and the supporting-plate of a ground-engaging implement. Fig. 4 is a rear view of the drag-bar. Fig. 5 is a front view of the drag-bar. Fig. 6 is a plan view of a casting or coupling-member employed. Fig. 7 is a side view of the casting. Fig. 8 is a side view of a pull-bar. Fig. 9 is a side view of a radius rod and an eye-bolt.

Referring now to the drawing for a more particular description, numeral 11 indicates a drag-bar preferably constructed of angle-iron, upon its horizontal flange 12 being mounted a suitable tongue 13, the vertical flange 14 of said drag-bar being provided with apertures arranged in groups, the apertures for each group being uniformly spaced apart and indicated at $a$, $b$ and $c$, best shown in Figs. 4 and 5 of the drawing.

Numerals 15 indicate brackets or apertured castings, each having a flange $d$. By means of bolts 16 the castings may be secured to the flange 14 of the drag-bar, and, as is obvious, the castings may be disposed nearer together or further from each other, as may be required.

Numerals 17 indicate supporting-plates, preferably constructed of angle iron, and the horizontal flange $e$ of each plate 17 is secured to a ground-engaging implement 18.

While I have shown each of these implements 18 to consist of a pair of opposed discs 19 connected by a shaft 20 journalled in an arm 21 which is secured to a plate 17, these particular features are not important, and I may employ any suitable ground-engaging implements to work at the sides or between the rows, the object of the present invention, broadly, being to provide means for making adjustments so that the implements may be disposed at suitable distances from each other, corresponding to the transverse distance between the rows, whether wide apart or narrow, and also to provide means for maintaining the implements parallel with the line of travel during the forward movement of the drag-bar, and thereby preventing any transverse swinging movements of the implements.

The vertical flanges $f$ of the supporting-plates 17 are preferably provided, midway between their ends with apertured castings 22 or brackets similar to the castings 15. Numerals 23 indicate draw-bars, each preferably having upset end-portions $g$, said bars being for the purpose of connecting the implements 18 with the drag-bar 11, their end-portions $g$ being disposed in the apertures of the castings 15 and 22.

Numerals 24 indicate radius rods, each being connected with the drag-bar 11 and to an end-portion of a supporting-plate 17. While I have shown each of these rods to be provided with an upset end-portion $h$ adapted to be received by an eye-bolt $k$ which is mounted in the vertical flange of the drag-bar, the opposite ends of the radius rods being secured to the vertical flanges $f$ of the supporting-plates 17, these particular features are not important, but are preferred for the reason that they facilitate the operation of making adjustments conveniently and readily.

The function to be discharged by each radius rod is to prevent any transverse swinging movement of a supporting-plate 17 and the implement carried thereby; and in operation said plates 17, on account of the action of the radius rods, will be maintained parallel with the drag-bar 11.

It is well known that the distance between the rows of corn as well as certain other crops depend upon inclination of the ground, fertility of the soil as well as other conditions, and it will be appreciated that, by use of the invention, the draw-bars may be readily adjusted to permit the implements to be disposed nearer together or further from each other, as required.

While in the present instance only three implements are shown attached to the drag-bar, a greater or lesser number obviously could be used. In making the adjustments, after the bolts 16 and $k$ have been removed from their apertures they may be inserted in other apertures of the groups shown in Figs. 4 and 5 to cause an increase or decrease in the distance from each other of the bars 23, no other adjustments being required, and while the device moves forwardly the implements may have swinging movements when encountering or moving over obstructions, but, on account of the action of the radius rods the draw-bars 23 will be maintained parallel with the line of travel.

I claim as my invention,—

In space-adjusting means for ground-engaging implements, each implement being provided with a supporting-plate having a vertical flange and provided with an apertured bracket midway between the ends of said flange, a drag-bar having a vertical flange provided longitudinally with apertures arranged in groups, apertured brackets for said drag-bar each being removably mounted in apertures of a group thereof, eye-bolts for said drag-bar each being removably mounted in an aperture of a group, draw-bars each having up-set end-portions engaging the bracket of a supporting-plate and a bracket of the drag-bar, and a plurality of radius-rods each having an up-set end-portion engaging an eye-bolt, its opposite end having a rigid connection with the vertical flange of a supporting-plate near one of the ends of said plate.

In testimony whereof, I have affixed my signature.

JOSEPH SPENCE.